(12) United States Patent
Daw (10) Patent No.: US 9,866,649 B2
(45) Date of Patent: *Jan. 9, 2018

(54) AUTOMATIC SCALING OF SYSTEM FOR PROVIDING ANSWERS TO REQUESTS

(71) Applicant: IAC Search & Media, Inc., Oakland, CA (US)

(72) Inventor: Alexander L. Daw, American Fork, UT (US)

(73) Assignee: IAC Search & Media, Inc., Oakland, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 14/536,511

(22) Filed: Nov. 7, 2014

(65) Prior Publication Data

US 2016/0134722 A1 May 12, 2016

(51) Int. Cl.
| | | |
|---|---|---|
| *G06F 15/16* | (2006.01) | |
| *H04L 29/08* | (2006.01) | |
| *H04L 12/24* | (2006.01) | |
| *H04L 12/26* | (2006.01) | |
| *G06F 9/46* | (2006.01) | |

(52) U.S. Cl.
CPC .......... *H04L 67/32* (2013.01); *H04L 41/0886* (2013.01); *H04L 41/0893* (2013.01); *H04L 41/0896* (2013.01); *H04L 43/0817* (2013.01); *G06F 9/46* (2013.01); *H04L 41/083* (2013.01); *H04L 43/04* (2013.01); *H04L 67/1008* (2013.01)

(58) Field of Classification Search
CPC . H04L 67/32; H04L 41/0893; H04L 41/0886; H04L 43/04; H04L 41/0896; H04L 43/0817; H04L 41/083
USPC ........................................................ 709/219
See application file for complete search history.

(56) References Cited

U.S. PATENT DOCUMENTS

| | | | | |
|---|---|---|---|---|
| 8,929,856 B1* | 1/2015 | Kamboh | ................. | H04W 4/22 370/352 |
| 2005/0002502 A1* | 1/2005 | Cloran | ............. | G06Q 10/06311 379/88.18 |
| 2009/0164214 A1* | 6/2009 | Baciu | .................. | H04M 3/5191 704/235 |
| 2012/0117005 A1* | 5/2012 | Spivack | ............ | G06F 17/30654 706/11 |
| 2013/0054682 A1* | 2/2013 | Malik | ................... | H04W 4/001 709/203 |
| 2013/0160024 A1* | 6/2013 | Shtilman | ............... | G06F 9/5083 718/105 |
| 2013/0317808 A1* | 11/2013 | Kruel | ..................... | H04L 51/32 704/9 |
| 2013/0326067 A1* | 12/2013 | Smith, II | ................ | H04L 47/70 709/226 |

(Continued)

*Primary Examiner* — Aftab N. Khan
(74) *Attorney, Agent, or Firm* — Baker & Hostetler LLP (57) ABSTRACT

The invention provides a computer system including a router receiving a plurality of requests, a broker and a plurality of service workers, each assigned by the broker receive to receive the request and determining an answer based on the request, the router receiving the answers from the service workers, and the router providing an output that is based on at least one of the answers. A language independent platform is provided that can deploy code online while processing requests, execute multiple commands and join their answers, and scale automatically depending on load.

10 Claims, 9 Drawing Sheets

(56) References Cited

U.S. PATENT DOCUMENTS

2016/0164787 A1* 6/2016 Roach .................. H04L 47/125
370/235

* cited by examiner

BROKER 14
Service Monitor 256
Manages active instance counts for all service workers deployed to the node.
Stats Monitor 258
Inspects all processes and logs all service stats.
These stats include RAM , CPU , SWAP, DISK USAGE, NETWORK IO, CONNECTION POOL.
Cluster Executor 260
Predicts the necessary number of service workers needed to maximize throughput and minimize request time. Distributes real time command and control signals to the cluster [ START / STOP / RESTART / SCALE DOWN / SCALE UP ]
Service Logger 262
Intercepts logging messages from workers attached to this broker and writes them to the log store.
Message Broker 264
Using Socket handles registers workers and maintains heartbeat messaging with all known workers. Forwards traffic from router sockets to worker sockets using an availability queue.
Peer Broker 266
Using UDP broadcasts and listeners creates a broker to broker socket connection. Connection used to broadcast broker node capacity to other brokers, and to facilitate capacity overflow operations.
Service Broadcaster 268
Using UPD broadcast messages announces this broker's presence on the network.
Service Index 270
Using TCP sockets gives broker status including number and type of workers active, machine load, message counts.
Service Pack Server 272
Using TCP sockets streams service pack routing code from actively deployed services.

FIG 9

Router 12
Node.js Cluster 280
HTTP Server 282
Node.js web server 284
Route Registry 286
Internal registry responsible for matching uniform resource locator (URL) patterns from service pack routes to commands, as well as planning the parallel execution plan for all commands.
Router Logic 288
Primary run time loop managing the execution of the command sequence defined by a service pack and matched to a registry plan. Manages synchronous and asynchronous flows of execution defined by a command chain.
Router Context 290
Shared context object responsible for aggregating all service responses from a route's command chains.
Commands 290
Service code abstraction responsible for defining the Router processing service via Router gateway calls. Responsible for all front end pre-processing / post-processing of the request sent to the broker service network.
Gateway 294
Interface for all commands to their respective service workers. Abstracts the complexity of connecting / discovering services on the distributed network, as well as managing speculative execution, failover, retry, and load balancing connection pools used to query the broker network.
Broker Detector 296
Listens for UPD Router traffic broadcast by Router brokers. Inspects Router broker indexes to determine what brokers are hosting which services. Responsible for removing dead brokers from the pool when brokers stop broadcasting.
Service Pack Loader 298
Deploys new or updated service pack route / command packages as they are discovered. Brokers are continuously inspected for newer versions of all service packs or newly added service packs. Deployment are online and seamless.
Router Service Logger 300
Distributes logging requests to the broker network for logging to log store.
Service Cache 302
Maintains a route specific cache for all requests and their responses. Cache automatically expires and reloads.

AUTOMATIC SCALING OF SYSTEM FOR PROVIDING ANSWERS TO REQUESTS

BACKGROUND OF THE INVENTION

1). Field of the Invention

This invention relates generally to a machine and to a method of operating a machine, more specifically to a machine and its method of use for providing responses to requests, and more specifically to a platform that can receive language independent processing code, deploy the code while processing requests online, execute multiple commands and join their answers, and scale automatically depending on load.

2). Discussion of Related Art

Computer systems are often used to provide responses to requests. A router receives the requests. The router then passes the requests to a service worker that determines an answer based on the request. The service worker then provides the answer to the router and router provides an output of the answer.

Commands are usually hard coded within such a system. As such, the system can only receive certain types of requests and provide certain types of answers. A search engine, for example, can only receive queries and provide results based on the queries. Such a system is thus not configurable to process different types of requests and provide different types of answers.

A load on a core of such a system can fluctuate depending on processing demand, in particular the number of requests and answers that are being processed. When the processing load becomes too high, it may not be possible for such a system to provide timely responses or answers to requests. Low volume traffic, on the other hand, will leave many system resources active, but unused.

A question and answer system usually has a single response. Because of the singular response, it is not possible to wait for answers based on multiple commands and then join the answers.

SUMMARY OF THE INVENTION

The invention provides a computer system including a router receiving a plurality of requests, a broker and a plurality of service workers, each assigned by the broker receive to receive the request and determining an answer based on the request, the router receiving the answers from the service workers, and the router providing an output that is based on at least one of the answers.

The computer system may further include a service pack store and a service pack stored in the service pack store, the service pack including at least one route and at least one worker, the broker deploying the service pack by distributing the at least one service worker to multiple locations to form the plurality of service workers, each at a respective one of the locations, and storing the routes within at least one router, wherein the request is distributed according to a command sequence based on the routes to the service workers at the multiple locations.

The router may further include a route registry responsible that matches uniform resource locator (URL) patterns from service pack routes to commands and plans a parallel execution plan for all commands.

The router may further include a router logic forming a primary run time loop managing the execution of the command sequence defined by a service pack and matched to a registry plan and manages synchronous and asynchronous flows of execution defined by a command chain.

The router may further include router context, namely shared context object responsible for aggregating all service responses from command chains of a route.

The router may further include a gateway, which is an interface for all commands to their respective service workers and commands, a command being a service code abstraction responsible for defining a processing service via router gateway calls.

The router may further include a broker detector which listens for router traffic broadcast by brokers, inspects broker indexes to determine what brokers are hosting which services and removes dead brokers when brokers stop broadcasting.

The router may further include a service pack loader that deploys new or updated service pack packages as they are discovered.

The router may further include a router service logger that distributes logging requests to the brokers for logging to a log store.

The router may further include a service cache that maintains a route specific cache for all requests and their responses.

The broker may further include a service monitor that manages active instance counts for all service workers deployed to a node.

The broker may further include a statistics monitor that inspects all processes and logs all service statistics.

The broker may further include a cluster executor that predicts the necessary number of service workers needed to maximize throughput and minimize request time and distributes real time command and control signals to a cluster of service workers clusters.

The broker may further include a service logger that intercepts logging messages from workers attached to the broker and writes them to the log store.

The broker may further include a message broker using socket handles registers workers and maintains heartbeat messaging with all known workers, and forwards traffic from router sockets to worker sockets using an availability queue.

The broker may further include a peer broker that uses user diagram protocol (UDP) broadcasts and listeners to create a broker to broker socket connection.

The broker may further include a service broadcaster using UDP broadcast messages to announce a presence of a broker on the network.

The broker may further include a service index using transmission control protocol (TCP) sockets to provide broker status including number and type of workers active, machine load, and message counts.

The broker may further include a service pack server using TCP sockets to stream service pack routing code from actively deployed services.

The service pack may be deployed while service workers other than the service workers that are being deployed determine answers based on requests.

The broker may split the service pack into a routing package and a processing package, install dependencies for the processing package without interrupting processing of the requests, the processing package reporting that the processing package is ready for traffic, the broker further installing dependencies for the routing package without interrupting processing of the requests, the routing package listening for processing packages that report ready for traffic, detecting a processing package that report ready for traffic, and routing, in response to detecting the processing package reporting ready for traffic, traffic matching routes defined by service processors of the routing package.

The broker may validate the service pack before splitting of the service pack, validates the routing package after the service pack is split, and validates the processing package after the service pack is split.

The answers may be answers from service workers respectively receiving first and second commands forming part of at least a first command chain, the router waiting for the answer based on the second command after receiving the answer based on the first command, detecting the answer based on the second command, and joining the answers based on the first and second commands in answer to detecting the answer based on the second command.

The service workers may receive a third command forming part of the first command chain, the router waiting for the answer based on the third command after receiving the answer based on the second command, detecting the answer based on the third command, and joining the answers based on the first, second and third commands in answer to detecting the answer based on the third command.

The answers may be answers from service workers respectively receiving first and second commands forming part of at least a second command chain that is executed after the answers are joined, the router waiting for the answer based on the second command of the second command chain after receiving the answer based on the first command of the second command chain, detecting the answer based on the second command, and joining the answers based on the first and second commands of the second command chain in answer to detecting the answer based on the second command of the second command chain.

The answers may be answers from first and second service workers, the broker determining a load due to the plurality of requests, calculating an optimal load, and adjusting a number of service workers, the number being adjusted based on the optimal load.

The determination of the load may include recording statistics of processing of the requests, determining a distributed node status from a distributed node status store and collecting cluster resources based on the statistics and distributed node status, wherein the calculation of the optimal load may include calculating an optimal cluster layout based on the cluster resources and updating a distributed configuration store with new instance counts for services based on the optimal cluster layout, the number of service workers being adjusted based on the new instance counts for services.

The invention also provides a computer-based method of processing data, including receiving, by a computing device, a plurality of requests, distributing, by the computing device, each request to a plurality of service workers, determining, by the computing device, a plurality of answers, each answer being determined by the service worker based on the request, receiving, by the computing device, the answers from the service workers and providing, by the computing device, an output that that is based on at least one of the answers.

The computer-based method may further include storing, by the computing device, a service pack in a service pack store, the service pack including at least one route and at least one worker, deploying, by the computing device, the service pack by distributing the at least one service worker to multiple locations to form the plurality of service workers, each at a respective one of the locations and storing the routes within at least one router, wherein the request is distributed based on the routes to the service workers at the multiple locations.

BRIEF DESCRIPTION OF THE DRAWINGS

The invention is further described by way of example with reference to the accompanying drawings, wherein:

FIG. 10 is an illustration of a router of the computer system showing components thereof;

DETAILED DESCRIPTION OF THE INVENTION

Figure 1:
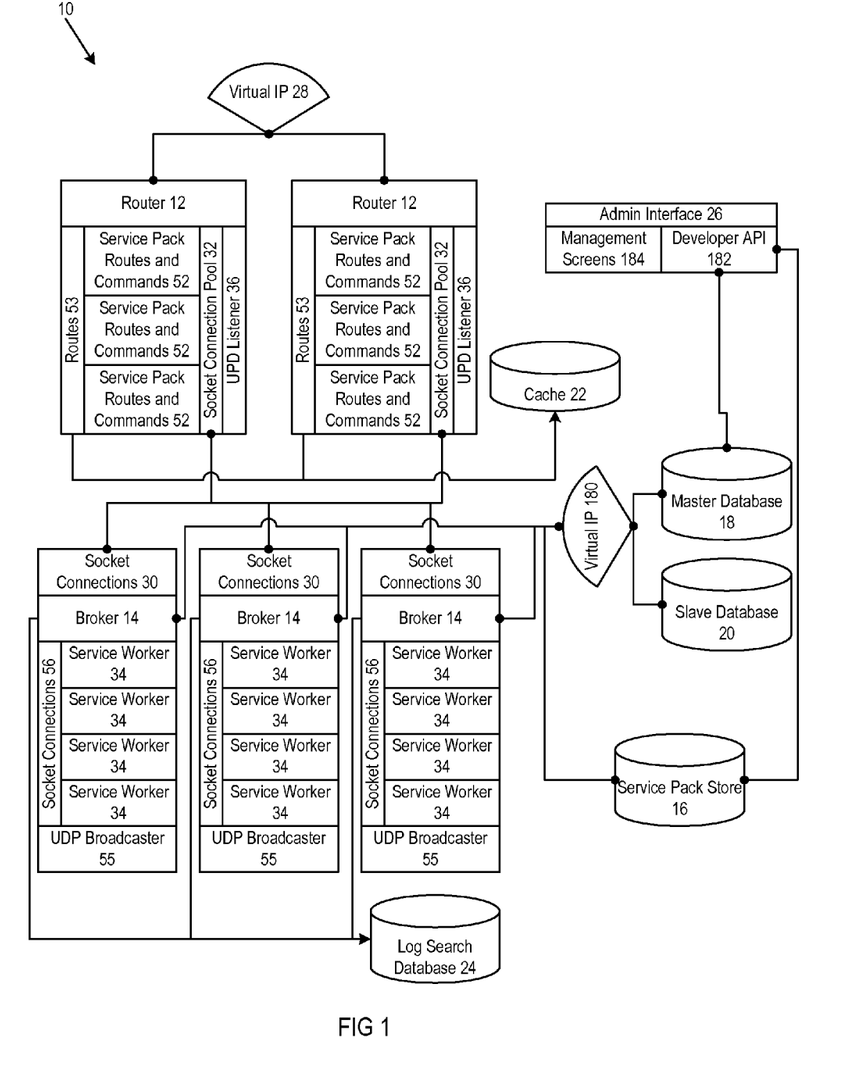
FIG. 1 is a block diagram of a computer system according to an embodiment of the invention.

FIG. 1 of the accompanying drawings illustrates a computer system 10, according to an embodiment of the invention that is particularly useful for providing answers to requests. The computer system 10 includes a plurality of routers 12, a plurality of brokers 14, a service pack store 16, a master database 18, a slave database 20, a cache 22, a log search database 24, and an administrative interface 26.

The routers 12 are connected to a virtual internet protocol (IP) 28. In use, the routers 12 receive a plurality of requests from the virtual IP 28. The brokers 14 have socket connections 30 that are connected to socket connection pools 32 of the routers 12. The routers 12 distribute the requests to the brokers 14 via the socket connection pools 32 and socket connections 30.

Each broker 14 has a plurality of service workers 34. One or more of the service workers 34 associated with a broker 14 may receive the request from the broker 14. The service worker or workers 34 determine an answer based on the request. The broker 14 associated with the service worker or workers 34 that have determined an answer receives the answers from the service worker or workers 34. The broker 14 then provides the answer to the router 12. The router 12 includes user diagram protocol (UDP) listeners 36 that receive the answers back from the brokers 14.

Figure 2:
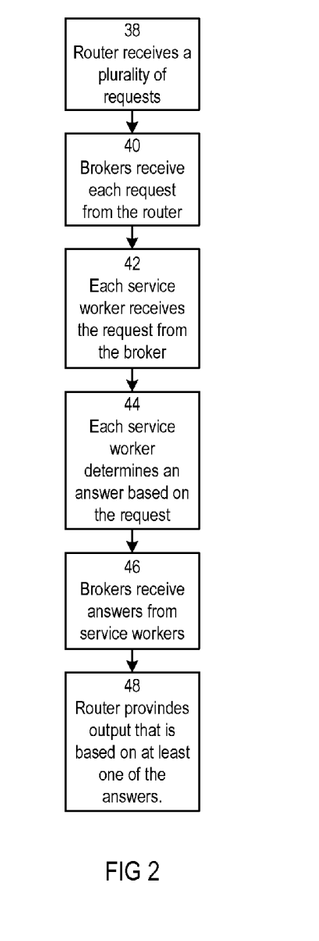
FIG. 2 is a flow chart illustrating request/answering functioning of the computer system.

FIG. 2 shows the process hereinbefore described in more detail. At 38, the router 12 receives a plurality of requests. At 40, the brokers 14 receive each request from the router 12. At 42, each service worker 34 receives the request from the broker 14. At 44, each service worker 34 determines an answer based on the request. At 46, the brokers 14 receive the answers from the service workers 34. At 48, the router 12 provides an output that is based on at least one of the answers.

Figure 3:
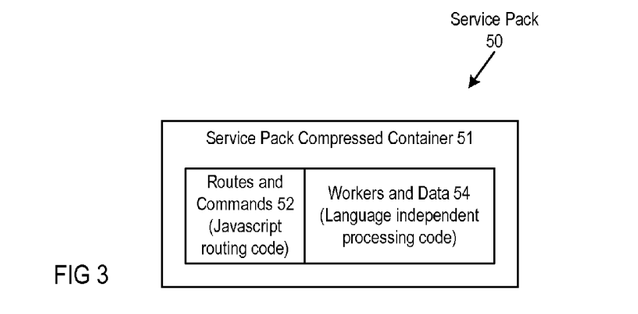
FIG. 3 is a block diagram of a service pack that is uploaded to a service pack store of the computer system.

FIG. 3 illustrates a service pack 50 that includes a service pack compressed container 51, routes and commands 52 and workers and data 54. The service pack 50 is located within the service pack store 16 in FIG. 1. The routes and commands 52 are written in JavaScript routing code, i.e. a first language. The workers and data 54 is written in a language independent processing code that can be different than the first language.

The brokers 14 in FIG. 1 download the service pack 50. The brokers 14 then store the routes and commands 52 within one or more of the routers 12. The broker 14 distributes the workers and data 54 to socket connections 56 so that there are multiple service workers 34 at multiple locations within the executable code. A request that is received by one of the routers 12 is distributed by the router 12 to the service workers 34 based on the routes forming part of the routes and commands 52 within the respective router 12. A user diagram protocol (UDP) broadcaster 55 associated with each broker 14 broadcast work status and completion of the respective service workers 34 to the UDP listeners 56 of the routers 12. Each router 12 may have multiple service pack routes and commands 52, stored within its routes 53. The routes and commands 52 and service workers 34 of multiple service packs can be executed simultaneously by one or more of the routers 12 and the brokers 14 match the answers to the requests for providing answers via the routers 12 to the virtual IP 28.

Figure 4:
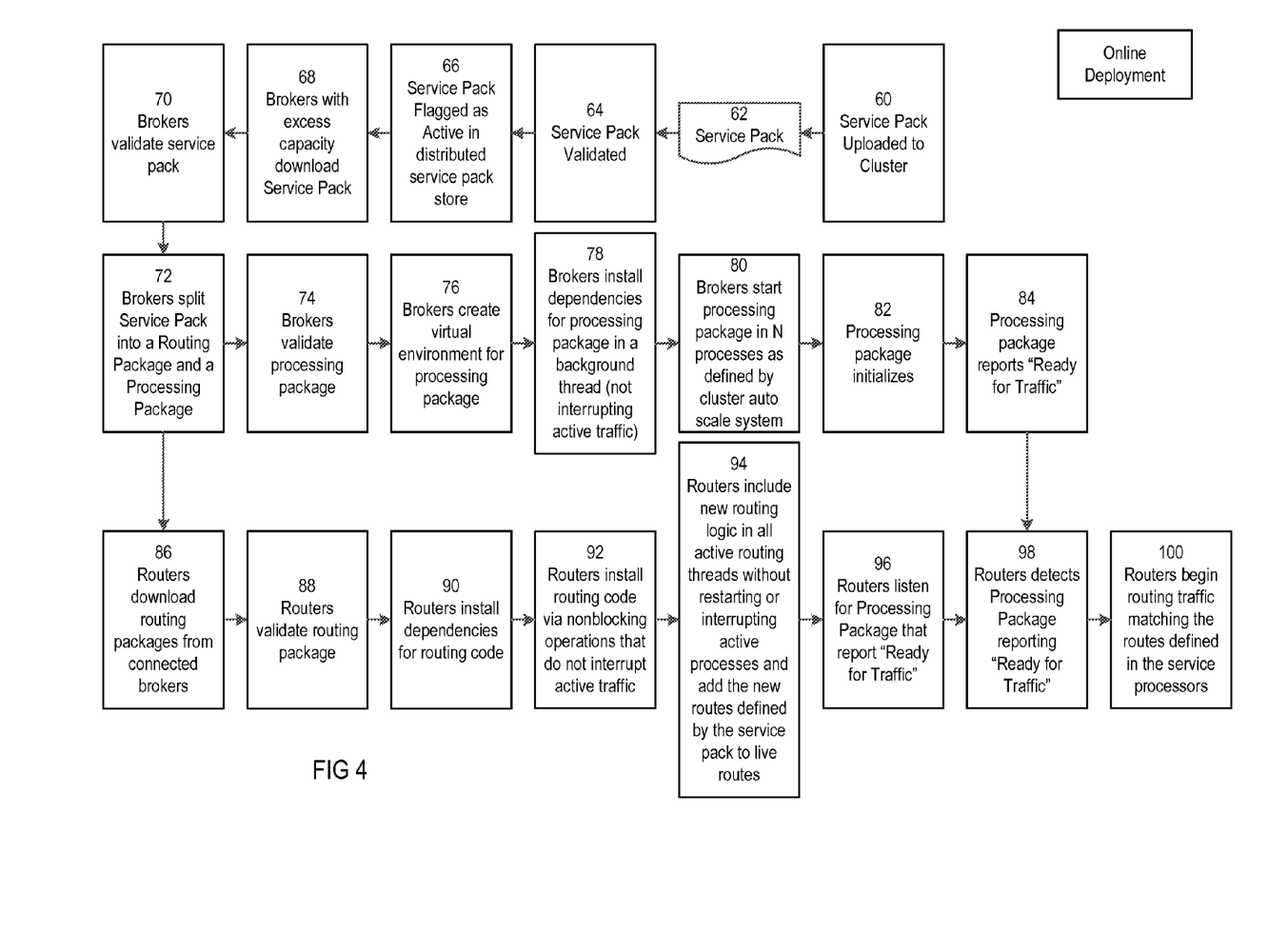
FIG. 4 is a flow chart illustrating online deployment of the service pack.

FIG. 4 illustrates online deployment of the service pack 50. Before the service pack 50 is deployed, the routers 12 may already have service pack routes and commands 52 stored in them and service workers 34 may be associated with the brokers 14. The existing service pack routes and commands 52 and service workers 34 may already be processing traffic as illustrated in FIG. 2. FIG. 4 illustrates the online deployment of the service pack 50 while the traffic is being processed as shown in FIG. 2 and described with reference to FIG. 1.

At 60, the new service pack is uploaded to the cluster. The new service pack is represented at 62. At 64, the new service pack is validated. At 66, the new service pack is flagged as active and is distributed to the service pack store 16. At 68, brokers 14 with excess capacity download the service pack 62. At 70, the brokers 14 validate the service pack 62. At 72, the brokers 14 split the service pack 62 into a routing package and a processing package.

At 74, the brokers 14 validate the processing package. At 76, the brokers 14 create a virtual environment for the processing package. At 78, the brokers 14 install dependencies for the processing package in a background thread. Active traffic is not interrupted. Such installation includes the distribution of the service workers 34 to multiple locations. At 80, the brokers 14 start the processing package in N processes as defined by an automatic scaling system. At 82, each processing package initializes. At 84, the respective processing packages each report "Ready for Traffic."

At 86, the routers 12 download the routing packages from the connected brokers 14. At 88, the routers 12 validate the routing packages. At 90, the routers 12 install dependencies for routing code. At 92, the routers 12 install routing code. The routing code is installed via non-blocking operations that do not interrupt active traffic. At 94, the routers 12 include new routing logic in all the active routing threads. The new routing logic is included without restarting or interrupting active processes. The new routing logic adds the new routes defined by the service pack 62 to live routes. At 96, the routers 12 listen for processing packages that report "Ready for Traffic."

When the router 12 at 98 detects a processing package that reports "Ready for Traffic," the router proceeds at 100 to begin routing traffic based on routes defined within service processors defined in the routing package. The service processors define routing to selected ones of the routers 12 and service workers 34.

Figure 5:
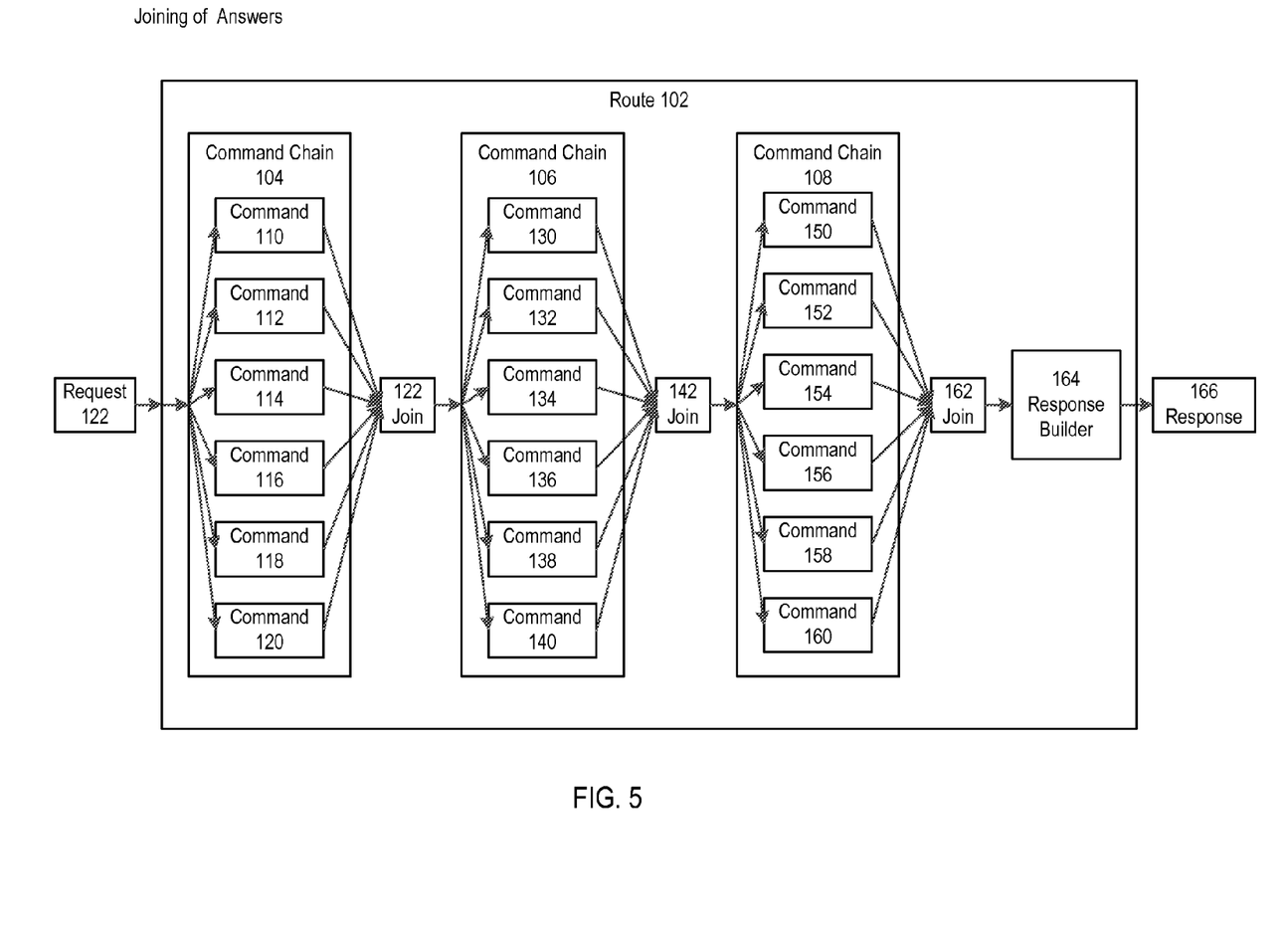
FIG. 5 is a block diagram illustrating a join function of a router of the computer system.

FIG. 5 illustrates a joining function that is used by the routers 12 in FIG. 1. A route 102 may include a plurality of command chains 104, 106 and 108. The command chain 104 may have a plurality of commands 110 to 120. When a request is received by the route 102, the route 102 passes the request on to the first command chain 104. The first command chain 104 then executes all commands 110 to 120 forming part thereof. Each command 110 to 120 may be executed by a separate service worker 34. The command 110 to 120 may take different amounts of time to provide an answer. The router 12 initially receives an answer based on a first of the commands 110. The router 12 then waits until answers based on all the commands are received. The router 12 may for example wait and then receive a second answer based on a second command 112 forming part of the command chain 104 and detect the answer. The router 12 continues to wait until answers based on all the remaining commands 114 to 120 are detected. When the router 12 detects answers based on all the commands 110 to 120 forming part of the command chain 104, the router 12 proceeds at 122 to join the answers. Such a joining of answers may take many forms, as will be understood as one of ordinary skill in the art, including selection, combination, executing a function based on the answers, etc.

After the responses are joined at 122, the router 12 executes the second command chain 106. The second command chain 106 includes a plurality of commands 130 to 140 that process a request following the joining at 122. The router 12 again waits until answers are detected based on all the commands 130 to 140 and then, at 142 joins the answers based on the commands 130 to 140.

Similarly, the router 12, in response to joining the answers at 142 executes the third command chain 108. The third command chain 108 may have a plurality of commands 150 to 160. At 162 the router 12 joins the answers based on the commands 150 to 160.

The route 102 includes a response builder 164. The answers that are joined at 162 are provided to the response builder 164. The response builder 164 uses the joined answers to calculate and provide a response 166.

The service pack 50 shown in FIG. 3 includes both routing code/logic (routes and commands 52) and service worker code (workers and data 54). A service pack may alternatively have route commands that can call service workers from other service packs. It is also possible that a service pack may only define node.js command logic aggregating responses from external web services and have no interaction with a service worker from its service pack. The following two examples are therefore possible:

1. A service pack contains only routing code. This code may call existing and external web services and aggregate their responses using the same .join( )/.does( ) logical chains. Or the service pack may only perform some transformation to the input given purely within the router.

2. A service pack may simply call service workers defined in other service packs via calls to the brokers hosting the services. This is made possible via the broker named service bus interface that routes messages to service workers over sockets via named entries in a service table maintained by each broker and advertised to each router.

Figure 6:
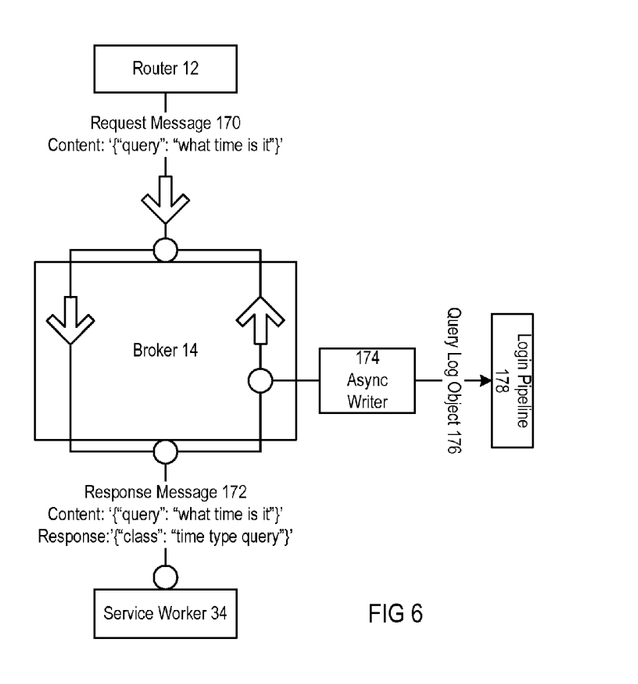
FIG. 6 is a block diagram of components of the computer system illustrating asynchronous writing into a login pipeline.

FIG. 6 illustrates a router 12 providing a request message 170 via a broker 14 to a service worker 34 for the query intent. The service worker 34 provides a response message 172 via the broker 14 to the router 12. An asynchronous writer 174 writes a query log object 176 into a login pipeline 178.

Referring again to FIG. 1, all the distributed brokers 14 provide centralized login and tracking to the log search database 24. The brokers 14 also store temporary data within the cache 22. The brokers 14 also write selective data into the master and slave databases 19 and 20 via the virtual IP 180. The data within the master database 18 can be accessed via a developer applications programmable interface (API) 182 for viewing on the administrative interface 26. An administrator can use the management screens 184 to view and potentially modify the data within the master database 18.

Figure 7:
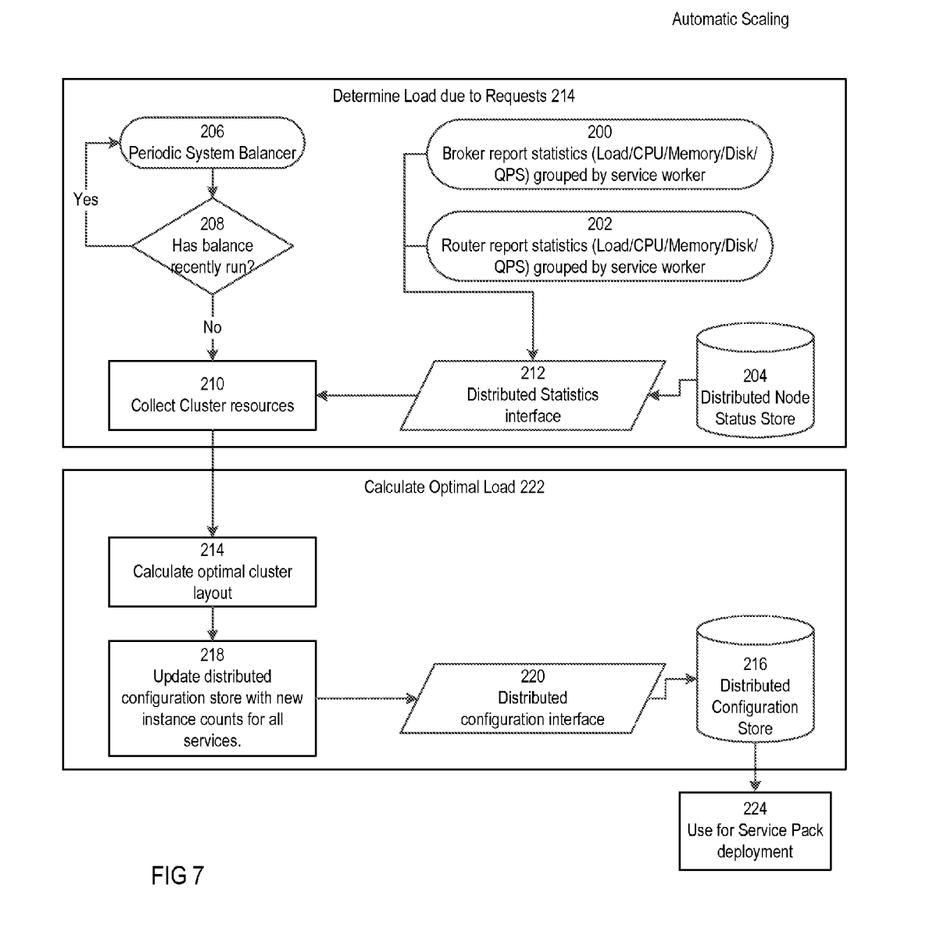
FIG. 7 is a flow chart illustrating automatic scaling of services.

FIG. 7 illustrates automatic scaling of resources, primarily in the form of the services workers 34, using data that is received from and written into the log search database 24.

At 200, broker report statistics are grouped by service worker. The statistics include load, computer processing unit (CPU) usage, memory usage, disk space usage and queries per second (QPS). At 202, similar statistics are stored for routers 12. A distributed node status store 204 includes data regarding the status of various nodes such as socket connections and UDP broadcasters and listeners. At 206, a periodic system balancer carries out rebalancing. At 208, a determination is made whether a balance has recently run. If no balance has recently run, then at 210, cluster resources are collected via a distributed statistics interface 212. The cluster resources include the broker report statistics, router report statistics and the statuses of the various nodes. In general, 202 to 212 comprise a determination of load due to requests 214.

At 214, an optimal load cluster layout is calculated based on the cluster resources collected at 210. A distributed configuration store 216 includes a configuration of an existing cluster layout for service workers, etc. At 218, the configuration within the distributed configuration store 216 is updated via a distributed configuration interface 220. The configuration is updated with new instance counts for all services. In general, 214 to 220 comprise a calculation of an optimal load 222. At 224, the configuration within the distributed configuration store 216 is used for service worker deployment, in particular for adding or removing service workers.

Figure 8:
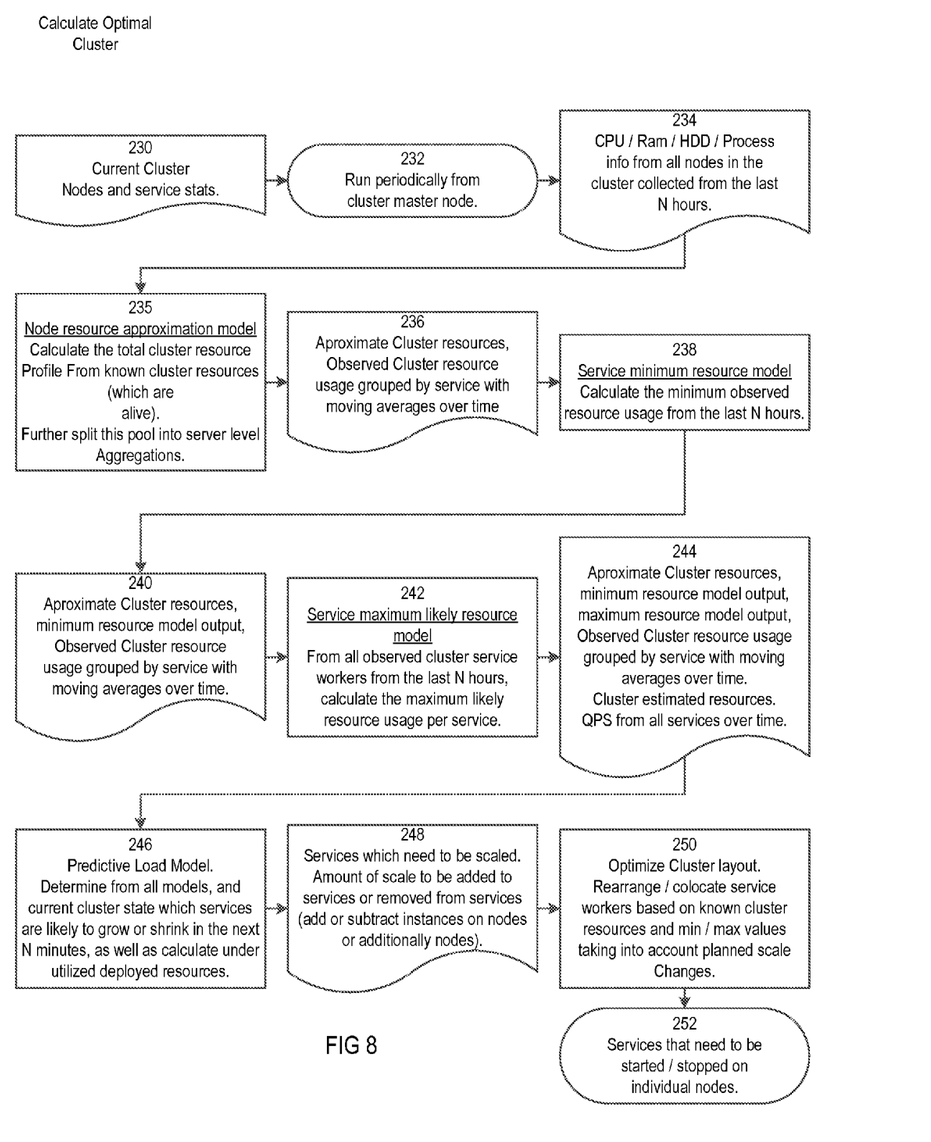
FIG. 8 is a flow chart illustrating how an optimal cluster is calculated.

FIG. 8 illustrates how the optimal cluster is calculated. 230 represents the current cluster nodes and services statistics. 232 represents periodic running of the optimal cluster configuration calculation from a cluster master node. At 234, CPU, memory, disk and process information are collected from all nodes in the cluster over the last N hours. At 235, a node resource approximation module is executed. The total cluster resource profile is calculated from all known cluster resources that are alive. The pool is further split into server level aggregations. At 236, approximate cluster resources and observed cluster resource usage are grouped by service with moving averages over time. At 238, a service minimum resource model is executed. The minimum observed resource usage is calculated from the last N hours. At 240, the approximate cluster resources, minimum resources model output and observed cluster resource usage are grouped by service with moving averages over time. At 242, a service maximum likely resource model is executed. From all observed cluster service workers over the last N hours, a maximum likely resource usage per service is calculated. At 244, the approximate cluster resources, minimum resource model output, maximum resources model output and observed cluster resource usage are grouped by service with moving averages over time. Cluster estimated resources and queries from all services over time are also grouped. At 246, a predictive load model is executed. A determination is made from all models and the current cluster state which services are likely to grow or shrink in the next N minutes and a calculation is made of underutilized deployed resources. At 248, services which need to be scaled are identified. The amount of scaling to be added to the services or removed from the services is determined. At 250, the cluster layout is optimized by rearranging/collocating service workers based on known cluster resources and minimum and maximum values taking into account planned scale changes. At 252, required services that need to be started or stopped are started or stopped on individual nodes.

Figure 9:
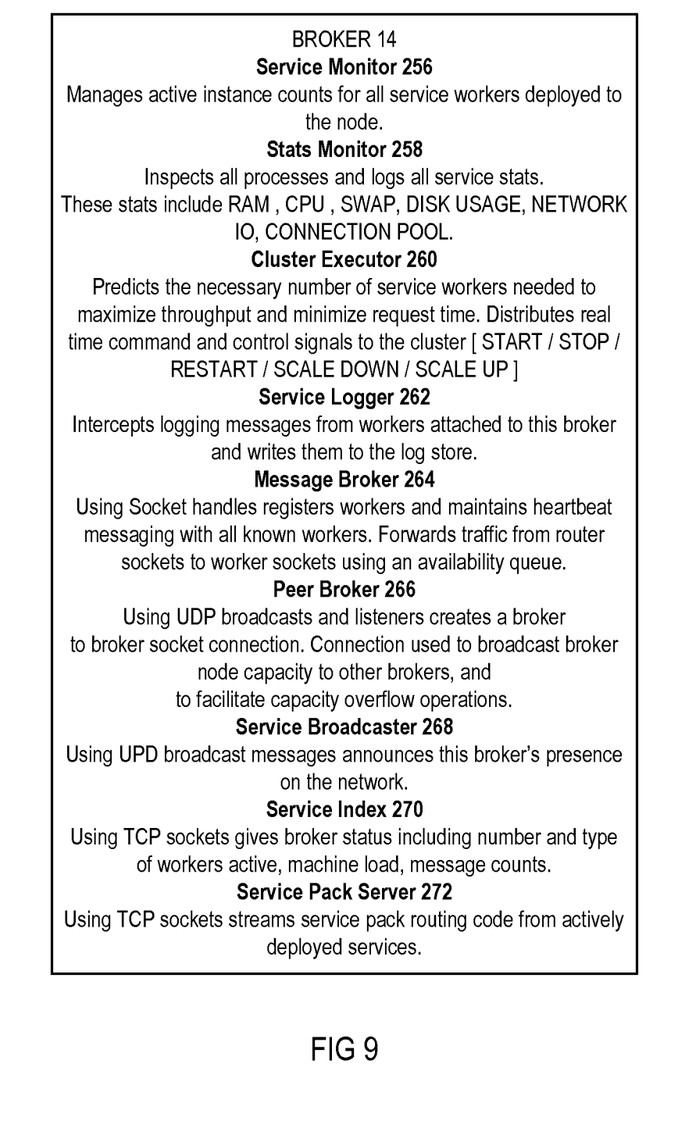
FIG. 9 is an illustration showing components of a broker forming part of the computer system.

FIG. 9 shows the components of a broker 14, including a service pack monitor 256, a statistics monitor 258, a cluster executor 260, a service logger 262, a message broker 264, a peer broker 266, a service broadcaster 268, a service index 270 and a service pack server 272. The functioning of the various components of the broker 14 is also included in the figure.

FIG. 10 shows the components of a router 12. The router 12 forms a node.js cluster 280, an HTTP server 282 and a node.js web server 284. The router 12 includes a route registry 286, router logic 288, router context 290, commands 290, a gateway 294, a broker detector 296, a service pack loader 298, a router service logger 300 and a service cache 302. The functioning of the various components of the route 12 is shown in the figure.

Figure 11:
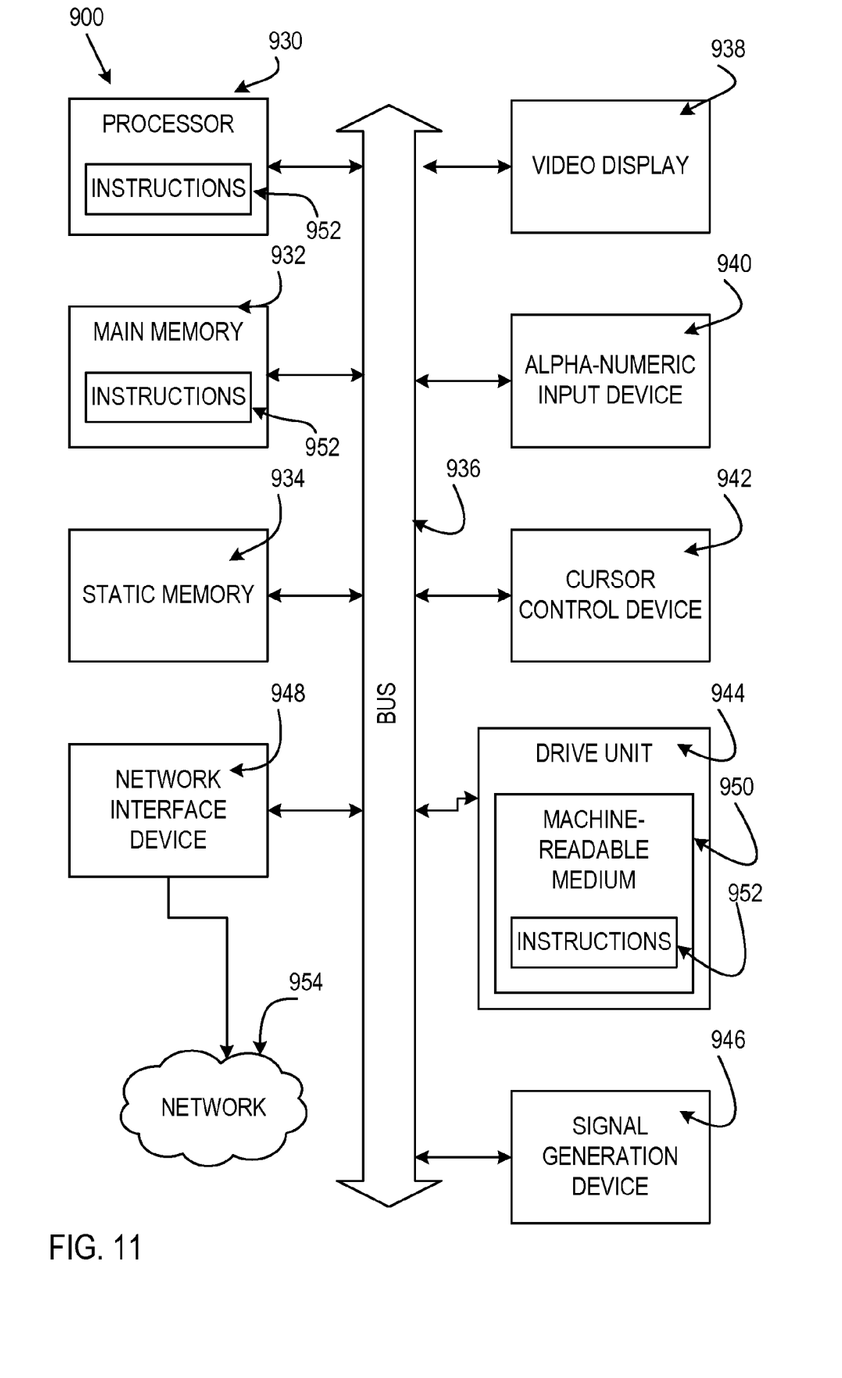
FIG. 11 is a block diagram of a machine in the form of a computer system forming part of the computer system.

FIG. 11 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal display (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While the instructions 952 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer-based method of processing data, comprising:
    receiving, by a computing device, a plurality of requests;
    distributing, by the computing device, each request to a plurality of service worker modules;
    determining, by the computing device, a plurality of answers, each answer being determined by the service worker module based on the request;
    receiving, by the computing device, the answers from the service worker module;
    providing, by the computing device, an output that that is based on at least one of the answers;
    collecting, by the computing device, observed cluster resources;
    determining, by the computing device, a load due to the plurality of requests based at least in part on the observed cluster resources;
    calculating, by the computing device, an optimal cluster layout; and
    adjusting, by the computing device, a number of service worker module, the number being adjusted based on the optimal cluster layout;
    wherein the determination of the load includes:
        recording, by the computing device, statistics of processing of the requests;
        determining, by the computing device, a distributed node status from a distributed node status store; and
        collecting, by the computing device, cluster resources based on the statistics and distributed node status and
    wherein the calculation of the optimal cluster layout includes:
        calculating, by the computing device, an optimal cluster layout based on the cluster resources; and
        updating, by the computing device, a distributed configuration store with new instance counts for services based on the optimal cluster layout in, the number of service worker modules being adjusted based on the new instance counts for services.

2. The method of claim 1, further comprising:
    storing, by the computing device, a service pack in a service pack store, the service pack including at least one route and at least one service worker module; and
    deploying, by the computing device, the service pack by distributing the at least one service worker module to multiple locations to form the plurality of service worker modules, each at a respective one of the locations, and storing the routes within at least one router, wherein the request is distributed based on the routes to the service worker modules at the multiple locations.

3. The method of claim 2, wherein the service pack is deployed while service worker modules other than the service worker modules that are being deployed determine answers based on requests.

4. The method of claim 3, further comprising:
    splitting, by the computing device, the service pack into a routing package and a processing package;
    installing, by the computing device, dependencies for the processing package without interrupting processing of the requests;
    reporting, by the computing system, that the processing package is ready for traffic;
    installing, by the computing device, dependencies for the routing package without interrupting processing of the requests;
    listening, by the computing device, using the routing package, for processing packages that report ready for traffic;
    detecting, by the computing device, using the routing package, a processing package that report ready for traffic; and
    routing, by the computing device, in response to detecting the processing package reporting ready for traffic, traffic matching routes defined by service processors of the routing package.

5. The method of claim 4, further comprising:
    validating, by the computing device, the service pack before splitting of the service pack;
    validating, by the computing device, the routing package after the service pack is split; and
    validating, by the computing device, the processing package after the service pack is split.

6. A computer system comprising:
    a router receiving a plurality of requests;
    a broker module; and
    a plurality of service worker modules;
    wherein each service worker module is assigned by the broker module to receive the request and determine an answer based on the request;
    wherein the router receives the answers from the service worker modules and provides an output that is based on at least one of the answers;
    wherein the broker module collects observed cluster resources; determines a load due to the plurality of requests at least in part from the observed cluster resources; calculates an optimal cluster layout; and adjusts a number of service worker modules, the number being adjusted based on the optimal cluster layout;
wherein the determination of the load includes:
recording statistics of processing of the requests;
determining a distributed node status from a distributed node status store; and
collecting cluster resources based on the statistics and distributed node status; and
wherein the calculation of the optimal load includes:
calculating an optimal cluster layout based on the cluster resources; and
updating a distributed configuration store with new instance counts for services based on the optimal cluster layout, the number of service worker modules being adjusted based on the new instance counts for services.

7. A computer system comprising:
a router receiving a plurality of requests;
a broker module;
a service pack store;
a service pack stored in the service pack store;
a plurality of service worker modules;
wherein the service pack includes at least one route and at least one service worker module;
wherein the broker module deploys the service pack by distributing the at least one service worker module to multiple locations to form the plurality of service worker modules, each at a respective one of the locations, and stores the routes within at least one router;
wherein each service worker module is assigned by the broker module to receive the request and determine an answer based on the request;
wherein the router receives the answers from the service worker modules and provides an output that is based on at least one of the answers;
wherein the request is distributed according to a command sequence based on the routes to the service worker modules at the multiple locations;
wherein the broker module collects observed cluster resources; determines a load due to the plurality of requests at least in part from the observed cluster resources; calculates an optimal cluster layout; and adjusts a number of service worker modules, the number being adjusted based on the optimal cluster layout.

8. The computer system of claim 7, wherein the service pack is deployed while service worker modules other than the service worker modules that are being deployed determine answers based on requests.

9. The computer system of claim 8, wherein the broker splits the service pack into a routing package and a processing package, installs dependencies for the processing package without interrupting processing of the requests, the processing package reporting that the processing package is ready for traffic, the broker module further installing dependencies for the routing package without interrupting processing of the requests, the routing package listening for processing packages that report ready for traffic, detecting a processing package that report ready for traffic, and routing, in response to detecting the processing package reporting ready for traffic, traffic matching routes defined by service processors of the routing package.

10. The computer system of claim 9, wherein the broker module validates the service pack before splitting of the service pack, validates the routing package after the service pack is split, and validates the processing package after the service pack is split.

* * * * *